United States Patent
Thuilliez et al.

(10) Patent No.: US 11,572,458 B2
(45) Date of Patent: Feb. 7, 2023

(54) DIACID-CROSSLINKED RUBBER COMPOSITION COMPRISING A PHENOLIC COMPOUND

(71) Applicant: COMPAGNIE GENERALE DES ETABLISSEMENTS MICHELIN, Clermont-Ferrand (FR)

(72) Inventors: Anne-Lise Thuilliez, Clermont-Ferrand (FR); Odile Gavard-Lonchay, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 191 days.

(21) Appl. No.: 16/954,799

(22) PCT Filed: Dec. 11, 2018

(86) PCT No.: PCT/FR2018/053177
§ 371 (c)(1),
(2) Date: Jun. 17, 2020

(87) PCT Pub. No.: WO2019/122587
PCT Pub. Date: Jun. 27, 2019

(65) Prior Publication Data
US 2021/0087366 A1  Mar. 25, 2021

(30) Foreign Application Priority Data
Dec. 21, 2017 (FR) ..................... 1762730

(51) Int. Cl.
C08L 7/00 (2006.01)
B60C 1/00 (2006.01)
(52) U.S. Cl.
CPC . C08L 7/00 (2013.01); B60C 1/00 (2013.01)
(58) Field of Classification Search
CPC .................................. C08L 7/00; B60C 1/00
USPC ....................................................... 524/337
See application file for complete search history.

(56) References Cited

U.S. PATENT DOCUMENTS

| | | | |
|---|---|---|---|
| 3,843,466 A | 10/1974 | Akahori et al. | |
| 4,075,159 A * | 2/1978 | Koyama | C08J 5/10 524/575.5 |
| 4,499,243 A * | 2/1985 | Rader | C08C 19/00 525/333.1 |
| 4,758,629 A | 7/1988 | Deyrup et al. | |
| 5,576,080 A | 11/1996 | Sugimoto et al. | |
| 6,774,255 B1 | 8/2004 | Tardivat et al. | |
| 6,903,165 B2 | 6/2005 | Yabui et al. | |
| 7,199,175 B2 | 4/2007 | Vasseur | |
| 7,250,463 B2 | 7/2007 | Durel et al. | |
| 7,300,970 B2 | 11/2007 | Durel et al. | |
| 7,488,768 B2 | 2/2009 | Tardivat et al. | |
| 7,491,767 B2 | 2/2009 | Durel et al. | |
| 7,534,917 B1 | 5/2009 | Ngo et al. | |
| 7,820,771 B2 | 10/2010 | Lapra et al. | |
| 7,900,667 B2 | 3/2011 | Vasseur | |
| 8,461,269 B2 | 6/2013 | Varagniat et al. | |
| 8,492,475 B2 | 7/2013 | Araujo Da Silva et al. | |
| 8,883,929 B2 | 11/2014 | Gandon-Pain et al. | |
| 9,010,393 B2 | 4/2015 | Araujo Da Silva et al. | |
| 9,539,859 B2 | 1/2017 | Shibata | |
| 10,544,292 B2 | 1/2020 | Doisneau et al. | |
| 10,544,298 B2 | 1/2020 | Doisneau et al. | |
| 10,590,225 B2 | 3/2020 | Thuilliez et al. | |
| 10,604,613 B2 | 3/2020 | Doisneau et al. | |
| 10,647,848 B2 | 5/2020 | Thuilliez et al. | |
| 10,711,131 B2 | 7/2020 | Thuilliez et al. | |
| 10,711,132 B2 | 7/2020 | Thuilliez et al. | |
| 2003/0120007 A1 | 6/2003 | Bortolotti et al. | |
| 2003/0212185 A1 | 11/2003 | Vasseur | |
| 2004/0019144 A1 | 1/2004 | Bortolotti et al. | |
| 2004/0051210 A1 | 3/2004 | Tardivat et al. | |
| 2004/0116613 A1 | 6/2004 | Yabui et al. | |
| 2004/0132880 A1 | 7/2004 | Durel et al. | |
| 2005/0004297 A1 | 1/2005 | Durel et al. | |
| 2005/0016650 A1 | 1/2005 | Durel et al. | |
| 2005/0016651 A1 | 1/2005 | Durel et al. | |
| 2007/0112120 A1 | 5/2007 | Vasseur | |
| 2008/0132644 A1 | 6/2008 | Lapra et al. | |
| 2009/0186961 A1 | 7/2009 | Araujo Da Silva et al. | |
| 2009/0209709 A1 | 8/2009 | Araujo Da Silva et al. | |
| 2009/0234066 A1 | 9/2009 | Araujo Da Silva et al. | |
| 2009/0270558 A1 | 10/2009 | Gandon-pain et al. | |

(Continued)

FOREIGN PATENT DOCUMENTS

CN  104327316 A  2/2015
EP  0247580 A2  12/1987

(Continued)

OTHER PUBLICATIONS

JP 2012097203 A, machine translation, EPO espacenet. (Year: 2012).*
International Search Report dated Mar. 20, 2019, in corresponding PCT/FR2018/053177 (5 pages).
N.M. Ahmad, et al., "Chain Transfer to Polymer in Free-Radical Solution Polymerization of n-Butyl Acrylate Studied by NMR Spectroscopy", Macromolecules, vol. 31, pp. 2822-2827 (1998).
M.M. Jacobi, et al., "Study of the Epoxidation of Polydiene Rubbers II", KGK Kautschuk Gummi Kunststoffe, vol. 57, No. 3, pp. 82-89 (2004).

(Continued)

Primary Examiner — Josephine L Chang
(74) Attorney, Agent, or Firm — Venable LLP

(57) ABSTRACT

A rubber composition is based on at least one elastomer comprising epoxide functions, a crosslinking system comprising a polycarboxylic acid and an imidazole and at least one phenolic compound, the aromatic nucleus of said phenolic compound being substituted with at least a carboxyl group, a hydrogenocarbonyl group, an amino group or an aminoalkyl radical.

7 Claims, No Drawings

(56) References Cited

U.S. PATENT DOCUMENTS

| | | |
|---|---|---|
| 2010/0022714 A1 | 1/2010 | Varagniat et al. |
| 2011/0021702 A1 | 1/2011 | Gandon-Pain et al. |
| 2011/0152458 A1 | 6/2011 | Araujo Da Silva et al. |
| 2012/0208948 A1 | 8/2012 | Gandon-Pain et al. |
| 2015/0368444 A1 | 12/2015 | Fleury et al. |
| 2016/0121654 A1 | 5/2016 | Shibata |
| 2016/0130418 A1 | 5/2016 | Schnell et al. |
| 2020/0031980 A1 | 1/2020 | Doisneau et al. |
| 2021/0087356 A1 | 3/2021 | Thuilliez et al. |
| 2021/0347966 A1 | 11/2021 | Gavard-Lonchay et al. |
| 2021/0380784 A1 | 12/2021 | Thuilliez et al. |

FOREIGN PATENT DOCUMENTS

| | | |
|---|---|---|
| EP | 0763564 A2 | 3/1997 |
| EP | 1403287 A1 | 3/2004 |
| EP | 3006206 A1 | 4/2016 |
| FR | 1455608 | 4/1966 |
| JP | 2007-269658 A | 10/2007 |
| JP | 2011-252107 A | 12/2011 |
| JP | 2012097203 A * | 5/2012 |
| JP | 2012-211122 A | 11/2012 |
| WO | 97/36724 A2 | 10/1997 |
| WO | 99/16600 A1 | 4/1999 |
| WO | 02/10269 A2 | 2/2002 |
| WO | 02/30939 A1 | 4/2002 |
| WO | 02/31041 A1 | 4/2002 |
| WO | 03/002648 A1 | 1/2003 |
| WO | 03/002649 A1 | 1/2003 |
| WO | 03/016387 A1 | 2/2003 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2008/003434 A1 | 1/2008 |
| WO | 2008/003435 A1 | 1/2008 |
| WO | 2014/095586 A1 | 6/2014 |
| WO | 2014/191315 A1 | 12/2014 |

OTHER PUBLICATIONS

J.J. Yu, et al., "Ultraviolet-Initiated Photografting of Glycidyl Methacrylate onto Styrene-Butadiene Rubber", J. Appl. Polymer Sci., vol. 73, pp. 1733-1739 (1999).

M.R. Grimmett, "12.3 Imidazoles", Science of Synthesis, chapter 12, pp. 325-528 (2002).

* cited by examiner

DIACID-CROSSLINKED RUBBER COMPOSITION COMPRISING A PHENOLIC COMPOUND

TECHNICAL FIELD OF THE INVENTION

The present invention relates to elastomer-based rubber compositions including epoxide functions, to composites comprising such compositions, and also to tyres comprising such compositions or such composites.

PRIOR ART

Tyre reinforcement plies usually comprise a rubber mixture and reinforcing cables, which are often metallic and covered at the surface with brass. Adhesion between the rubber mixture and the metal cables is created by means of the phenomenon of sulfurization of the brass-coated surface of the cable. However, the interphase created may change under the effect of humidity, temperature or corrosive elements.

The adhesion function generally imposes specific formulations on the rubber mixture, notably the need for a high content of sulfur and of zinc oxide, a low amount of stearic acid, the presence of a cobalt salt, and the use of a delayed-action accelerator.

It is thus an ongoing concern of tyre manufacturers to find formulations which make it possible to dispense with the sulfur in the composites while at the same time allowing good adhesion to the reinforcing cables.

WO 2014/095586 describes a tyre comprising a rubber composition based on at least one elastomer comprising epoxide functions, a crosslinking system comprising a polycarboxylic acid and an imidazole, which is directed towards simplifying the compositions relative to other crosslinking systems and towards improving the hysteresis properties. Said document does not address the problem of adhesion of the composition to cables.

Patent application JP 2011252107 describes a rubber composition with good adhesion to metal, this composition comprising a diene elastomer and cobalt salt. Gallic acid or a gallic acid hydrate facilitates the dissolution of the cobalt salt. The composition is crosslinked with a sulfur-based system.

SUMMARY OF THE INVENTION

Continuing its research, the Applicant has discovered a rubber composition based on at least one elastomer comprising epoxide functions, at least one reinforcing filler, a crosslinking system comprising a polycarboxylic acid, an imidazole and at least one specific phenolic compound, which has particularly advantageous characteristics in terms of adhesion to a reinforcing element, in particular for making composites intended for tyres. The composition according to the invention thus makes it possible to obtain excellent adhesion to reinforcing elements, not requiring any vulcanization or sulfurization, or the presence of cobalt salts.

DETAILED DESCRIPTION OF THE INVENTION

The invention relates to a rubber composition based on at least one elastomer comprising epoxide functions, at least one reinforcing filler, a crosslinking system comprising a polycarboxylic acid of general formula (I)

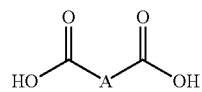

in which A represents a covalent bond or a hydrocarbon-based group including at least 1 carbon atom, which is optionally substituted and which is optionally interrupted with one or more heteroatoms, an imidazole of general formula (II)

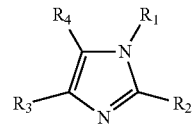

in which:
  $R_1$ represents a hydrocarbon-based group or a hydrogen atom,
  $R_2$ represents a hydrocarbon-based group,
  $R_3$ and $R_4$ represent, independently of each other, a hydrogen atom or a hydrocarbon-based group, or alternatively $R_3$ and $R_4$ form, together with the carbon atoms of the imidazole ring to which they are attached, a ring, and at least one phenolic compound of general formula (III)

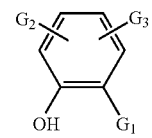

in which:
  $G_1$ represents a hydroxyl, carboxyl, hydrogenocarbonyl or amino group or an aminoalkyl radical;
  $G_2$ and $G_3$ represent, independently of each other, a hydrogen atom or a group chosen from carboxyl, hydrogenocarbonyl and hydroxyl groups, or a radical chosen from alkyl, cycloalkylalkyl, aryl, aralkyl, aryloxy, alkoxy, carboxylalkyl, carbonylalkyl, alkylcarbonyl, arylcarbonyl and aminoalkyl radicals;
the aromatic nucleus of said phenolic compound of general formula (III) being substituted with at least a carboxyl group, a hydrogenocarbonyl group, an amino group or an aminoalkyl radical.

Definitions

The expression "composition based on" should be understood as meaning a composition including the mixture and/or the product of the in situ reaction of the various constituents used, some of these (base) constituents being able to react and/or being intended to react with each other, at least partially, during the various phases of manufacture of the composition, modifying the composition as it is prepared at the start. Thus, the compositions as employed for the invention may be different in the non-crosslinked state and in the crosslinked state.

The expression "part by weight per hundred parts by weight of elastomer" (or phr) should be understood, within the meaning of the present invention, as meaning the part by mass per hundred parts by mass of elastomer.

In the present document, unless expressly indicated otherwise, all the percentages (%) shown are mass percentages (%).

Furthermore, any interval of values denoted by the expression "between a and b" represents the range of values extending from more than "a" to less than "b" (i.e. limits a and b excluded), while any interval of values denoted by the expression "from a to b" means the range of values extending from "a" up to "b" (i.e. including the strict limits a and b). In the present document, when an interval of values is denoted by the expression "from a to b", the interval represented by the expression "between a and b" is also and preferentially denoted.

The term "molar equivalent", which is well known to those skilled in the art, should be understood as meaning the quotient between the number of moles of the compound or function concerned and the number of moles of the reference compound or function. Thus, 2 equivalents of a compound or function B relative to a compound or function A represent 2 mol of the compound or function B when 1 mol of the compound or function A is used.

The compounds comprising carbon mentioned in the description may be of fossil origin or biobased. In the latter case, they may be partially or totally derived from biomass or may be obtained from renewable starting materials derived from biomass. Polymers, plasticizers, fillers and the like are notably concerned.

Elastomer Comprising Epoxide Functions

The term "elastomer or rubber (the two terms being, in a known manner, synonymous and interchangeable) comprising epoxide functions" means any type of elastomer within the meaning known to a person skilled in the art, whether it is a homopolymer or a block, statistical or other copolymer, having elastomeric properties, which is epoxide-functionalized (or epoxidized), that is to say it bears epoxide functional groups. The terms "elastomer comprising epoxide functions" and "epoxidized elastomer" are used without distinction.

The epoxidized elastomers are, in a known manner, solid at room temperature (20° C.); the term "solid" refers to any substance not having the ability to eventually assume, at the latest after 24 hours, solely under the effect of gravity and at room temperature (20° C.), the shape of the container in which it is present.

The glass transition temperature Tg of the elastomers described in the present text is measured in a known manner by DSC (Differential Scanning calorimetry), for example, and unless specifically indicated otherwise, according to the standard ASTM D3418 of 1999.

The rubber composition in accordance with the invention may contain only one epoxidized elastomer or a mixture of several epoxidized elastomers (which will then be denoted in the singular as being "the epoxidized elastomer" to represent the sum of the epoxidized elastomers of the composition), the elastomer comprising epoxide functions possibly being used in combination with any type of non-epoxidized elastomer, for example diene elastomer, or even with elastomers other than diene elastomers.

The epoxidized elastomer is predominant in the rubber composition according to the invention, that is to say that it is either the only elastomer or it is the one which represents the greatest mass among the elastomers of the composition.

According to a preferential embodiment of the invention, the rubber composition comprises from 30 to 100 phr, in particular from 50 to 100 phr and preferably from 70 to 100 phr of a predominant epoxidized elastomer as a blend with from 0 to 70 phr, in particular from 0 to 50 phr and preferably from 0 to 30 phr of one or more other non-epoxidized minor elastomers.

According to another preferential embodiment of the invention, the composition includes, for the whole of the 100 phr of elastomer, one or more epoxidized elastomers.

The degree (mol %) of epoxidation of the epoxidized elastomers may vary to a great extent according to the particular embodiments of the invention, preferably within a range from 0.1% to 80%, preferentially within a range from 0.1% to 50% and more preferentially within a range from 0.3% to 50%. When the degree of epoxidation is less than 0.1%, there is a risk of the targeted technical effect being insufficient whereas, above 80%, the intrinsic properties of the polymer are degraded. For all these reasons, the degree of functionalization, notably of epoxidation, is more preferentially within a range from 0.3% to 30%, advantageously within a range from 2.5% to 30%.

The epoxidized elastomer may be chosen from the group consisting of epoxidized diene elastomers, epoxidized olefinic elastomers and mixtures thereof. Preferentially, the epoxidized elastomer is chosen from epoxidized olefinic elastomers and mixtures thereof. According to another preferential variant of the invention, the epoxidized elastomer is chosen from epoxidized diene elastomers and mixtures thereof.

It is recalled that the term "elastomer of the epoxidized diene type" should be understood as meaning an elastomer which is derived at least partly (i.e., a homopolymer or a copolymer) from diene monomers (monomers bearing two conjugated or non-conjugated carbon-carbon double bonds), this polymer being functionalized, that is to say that it bears epoxide functional groups.

A first characteristic of epoxidized diene elastomers is thus they are diene elastomers. These diene elastomers, by definition non-thermoplastic in the present patent application, with a Tg which in the vast majority of cases is negative (that is to say, less than 0° C.), may be categorized in a known manner into two categories: those referred to as "essentially unsaturated" and those referred to as "essentially saturated". Butyl rubbers, for instance copolymers of dienes and of α-olefins of EPDM type, come within the category of essentially saturated diene elastomers, having a content of units of diene origin which is low or very low, always less than 15% (mol %). In contrast, the term "essentially unsaturated diene elastomer" means a diene elastomer derived at least partly from conjugated diene monomers, having a content of moieties or units of diene origin (conjugated dienes) which is greater than 15% (mol %). In the category of "essentially unsaturated" diene elastomers, a "highly unsaturated" diene elastomer in particular refers to a diene elastomer having a content of units of diene origin (conjugated dienes) which is greater than 50%.

It is preferable to use at least one diene elastomer of the highly unsaturated type, in particular a diene elastomer chosen from the group consisting of natural rubber (NR), synthetic polyisoprenes (IRs), polybutadienes (BRs), butadiene copolymers, isoprene copolymers and mixtures of these elastomers. Such copolymers are more preferentially chosen from the group consisting of butadiene/styrene copolymers (SBRs), isoprene/butadiene copolymers (BIRs), isoprene/styrene copolymers (SIRs), isoprene/butadiene/styrene copolymers (SBIRs) and mixtures of such copolymers.

The above diene elastomers may, for example, be block, statistical, sequential or microsequential elastomers and may be prepared in dispersion or in solution; they may be coupled and/or star-branched or else functionalized with a coupling and/or star-branching or functionalization agent.

The following are preferentially suitable for use: polybutadienes and in particular those with a content of 1,2-units of between 4% and 80% or those with a content of cis-1,4-units of greater than 80%, polyisoprenes, butadiene/styrene copolymers and in particular those with a styrene content of between 5% and 50% by weight and more particularly between 20% and 40%, a content of 1,2-bonds of the butadiene part of between 4% and 65% and a content of trans-1,4-bonds of between 20% and 80%, butadiene/isoprene copolymers and notably those with an isoprene content of between 5% and 90% by weight and a glass transition temperature from −40° C. to −80° C., or isoprene/styrene copolymers and notably those with a styrene content of between 5% and 50% by weight and a Tg of between −25° C. and −50° C.

In the case of butadiene/styrene/isoprene copolymers, those with a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content of 1,2-units of the butadiene part of between 4% and 85%, a content of trans-1,4-units of the butadiene part of between 6% and 80%, a content of 1,2-plus 3,4-units of the isoprene part of between 5% and 70% and a content of trans-1,4-units of the isoprene part of between 10% and 50%, and more generally any butadiene/styrene/isoprene copolymer with a Tg of between −20° C. and 70° C., are notably suitable for use.

A second essential characteristic of the epoxidized diene elastomer that is useful for the purposes of the invention is that it is functionalized, bearing epoxide functional groups.

The epoxide functions present in the diene elastomer are obtained by copolymerization or by post-polymerization modification and will either be borne directly by the backbone of the chain or will be borne by a side group, depending on the method of preparation, for example by epoxidation or any other modification of the diene functions present in the elastomeric chain after copolymerization.

The epoxidized diene elastomers may, for example, be obtained in a known manner by epoxidation of the equivalent non-epoxidized diene elastomer, for example via processes based on chlorohydrin or on bromohydrin or processes based on hydrogen peroxides, on alkyl hydroperoxides or on peracids (such as peracetic acid or performic acid); see notably Kautsch. Gummi Kunstst., 2004, 57(3), 82. The epoxide functions are then in the polymer chain. Mention may notably be made of epoxidized natural rubbers (abbreviated as "ENRs"); such ENRs are, for example, sold under the names "ENR-25" and "ENR-50" (respective degrees of epoxidation of 25% and 50%) by the company Guthrie Polymer. Epoxidized BRs are themselves also well known, for example sold by the company Sartomer under the name "Poly Bd" (for example, "Poly Bd 605E"). Epoxidized SBRs may be prepared by epoxidation techniques that are well known to a person skilled in the art.

Diene elastomers bearing epoxide groups have been described, for example, in US 2003/120007 or EP 0 763 564, and U.S. Pat. No. 6,903,165 or EP 1 403 287.

Preferentially, the epoxidized diene elastomer is chosen from the group consisting of epoxidized natural rubbers (NRs) (abbreviated as "ENRs"), epoxidized synthetic polyisoprenes (IRs), epoxidized polybutadienes (BRs) preferentially with a content of cis-1,4-bonds of greater than 90%, epoxidized butadiene/styrene copolymers (SBRs) and mixtures of these elastomers.

The epoxidized diene elastomers may also contain pendant epoxide functions. In this case, they may be obtained either by post-polymerization modification (see, for example, J. Appl. Polym. Sci., 1999, 73, 1733); or by radical copolymerization of the diene monomers with monomers bearing epoxide functions, notably methacrylic acid esters including epoxide functions, for instance glycidyl methacrylate (this radical polymerization, notably in bulk, in solution or in dispersed medium—notably dispersion, emulsion or suspension—is well known to a person skilled in the art of the synthesis of polymers; mention may be made, for example, of the following reference: Macromolecules 1998, 31, 2822) or by the use of nitrile oxides bearing epoxide functions. For example, US 2011/0 098 404 describes the emulsion copolymerization of 1,3-butadiene, styrene and glycidyl methacrylate.

It should be recalled that the expression "elastomer of the epoxidized olefinic type" should be understood as meaning an epoxide-functionalized elastomer, that is to say that it bears epoxide functional groups, and the elastomeric chain of which is a carbon-based chain predominantly including olefin monomer units denoted as O.

The monomers O may originate from any olefin known to those skilled in the art, for instance ethylene, propylene, butylene or isobutylene, these monomers optionally being substituted with linear or branched alkyl groups.

Preferentially, O is an ethylene [—$CH_2$—$CH_2$—] unit and, in this preferential case, the epoxidized olefinic elastomer is an epoxidized ethylenic elastomer, which makes it possible to improve the compromise between the stiffness and hysteresis performance qualities in the rubber compositions according to the invention.

The molar content of O is greater than 50%. More precisely, the molar content of O is between 50% and 95% and preferentially between 65% and 85%. For the purposes of the present invention, the elastomer of olefinic type is thus a copolymer also including from 5 to 50 mol % of non-olefinic units, i.e. units other than O.

These non-olefinic units are composed, partially or completely, of units bearing epoxide functional groups, denoted as R, necessary for the requirements of the invention.

The content (mol %) of R units of the epoxidized olefinic elastomers described previously may vary to a great extent according to the particular embodiments of the invention, preferably within a range from 0.1% to 50%, preferentially within a range from 0.3% to 50%, more preferentially within a range from 0.3% to 30%, and very preferentially within a range from 2.5% to 30%. When the content of R units is less than 0.1%, there is a risk of the targeted technical effect being insufficient whereas, above 50%, the elastomer would no longer be predominantly olefinic.

In the case where not all the non-olefinic units are R units, other units, denoted as A', are present in the carbon-based chain in such a way that the total molar content represented by the monomers O, R and A' is equal to 100%. The non-olefinic monomers that are useful for preparing the epoxidized olefinic elastomers may be chosen from non-olefinic monomers not resulting in unsaturations and monomers which, once polymerized, result in unsaturations borne by the elastomer chain (other than diene monomers).

The non-olefinic monomers not resulting in unsaturations are essentially vinyl and acrylic/methacrylic monomers. For example, such monomers may be chosen from styrene, vinyl acetate, vinyl alcohol, acrylonitrile, methyl acrylate or methyl methacrylate, these monomers optionally being substituted with alkyl or aryl groups or other functionalized groups.

For example also, the non-diene monomers that are useful for preparing the elastomers of olefinic type bearing unsaturations by copolymerization are all those known to a person skilled in the art for forming unsaturated elastomers, for instance dicyclopentadienyloxyethyl methacrylate.

An essential characteristic of the epoxidized olefinic elastomer that is useful for the purposes of the invention is that it is functionalized, bearing epoxide functional groups.

Epoxidized olefinic elastomers and processes for preparation same are well known to those skilled in the art. Olefinic elastomers bearing epoxide groups have been described, for example, in EP 0 247 580 and U.S. Pat. No. 5,576,080. The company Arkema markets epoxidized polyethylenes under the trade names Lotader AX8840 and Lotader AX8900.

The epoxide function may be borne directly by the carbon backbone and is then mainly obtained by epoxidation of carbon-carbon double bonds initially present after copolymerization. This epoxidation of unsaturated polymers is well known to those skilled in the art and may be performed, for example, via processes based on chlorohydrin or bromohydrin, direct oxidation processes or processes based on hydrogen peroxides, on alkyl hydroperoxides or on peracids (such as peracetic acid or performic acid).

The epoxide function may also be pendant and is then either already present in a monomer involved in the copolymerization with the olefin (this monomer may, for example, be glycidyl methacrylate, allyl glycidyl ether or vinyl glycidyl ether) or obtained by the post-copolymerization modification of a pendant function.

The epoxidized olefinic elastomers have a Tg which in the vast majority of cases is negative (that is to say, less than 0° C.).

The epoxidized olefinic elastomers have a number-average molar mass (Mn) of at least 10 000 g/mol, preferentially of at least 15 000 g/mol, and of not more than 1 500 000 g/mol. The polydispersity index PI, equal to Mw/Mn (Mw being the weight-average molar mass), is between 1.05 and 11.00.

Preferably, and to sum up, the olefinic elastomer comprising epoxide functions is thus a copolymer containing at least 50% (in moles) of olefin monomer units and with a number of different monomer units of greater than or equal to 2, preferentially from 2 to 5 and more preferentially 2 or 3. This copolymer may be obtained by copolymerization or by post-polymerization modification of an elastomer. The epoxide functions present in the olefinic copolymer, obtained by copolymerization or by post-polymerization modification, will either be borne directly by the backbone of the chain or will be borne by a side group, depending on the method of preparation, for example by epoxidation or any other modification of the diene functions present in the elastomeric chain after copolymerization.

Reinforcing Filler

Use may be made of any type of reinforcing filler known for its abilities to reinforce a rubber composition that may be used for the manufacture of tyres, for example an organic filler such as carbon black, a reinforcing inorganic filler such as silica, or else a blend of these two types of filler, notably a blend of carbon black and of silica.

All carbon blacks, notably blacks of the HAF, ISAF or SAF type, conventionally used in tyres ("tyre-grade" blacks) are suitable as carbon blacks. Mention will more particularly be made, among the latter, of the reinforcing carbon blacks of the 100, 200 or 300 series (ASTM grades), for instance the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, patent applications WO 97/36724 and WO 99/16600).

As examples of organic fillers other than carbon blacks, mention may be made of functionalized polyvinyl organic fillers, as described in patent applications WO-A-2006/069792, WO-A-2006/069793, WO-A-2008/003434 and WO-A-2008/003435.

In the present patent application, the term "reinforcing inorganic filler" should be understood, by definition, as meaning any inorganic or mineral filler (regardless of its colour and its origin, natural or synthetic), also known as "white filler", "clear filler" or even "non-black filler", as opposed to carbon black, which is capable of reinforcing by itself, without any means other than an intermediate coupling agent, a rubber composition intended for the manufacture of tyres, in other words capable of replacing, in its reinforcing role, a conventional tyre-grade carbon black; such a filler is generally characterized, in a known manner, by the presence of hydroxyl (—OH) groups at its surface. The physical state in which the reinforcing inorganic filler is provided is not important, whether it be in the form of a powder, of micropearls, of granules, of beads or any other appropriate densified form. Needless to say, the term "reinforcing inorganic filler" also means mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are notably suitable for use as reinforcing inorganic fillers. The silica used may be any reinforcing silica known to those skilled in the art, notably any precipitated or fumed silica with a BET surface area and also a CTAB specific surface area both of less than 450 $m^2/g$, preferably from 30 to 400 $m^2/g$. As highly dispersible precipitated silicas ("HDSs"), mention will be made, for example, of the Ultrasil 7000 and Ultrasil 7005 silicas from the company Degussa, the Zeosil 1165MP, 1135MP and 1115MP silicas from the company Rhodia, the Hi-Sil EZ150G silica from the company PPG, the Zeopol 8715, 8745 and 8755 silicas from the company Huber or the silicas with a high specific surface area as described in patent application WO 03/16837.

The reinforcing inorganic filler used, in particular if it is silica, preferably has a BET surface area of between 45 and 400 $m^2/g$, more preferentially of between 60 and 300 $m^2/g$.

Preferentially, the content of total reinforcing filler (carbon black and/or reinforcing inorganic filler, such as silica) is between 20 and 200 phr, more preferentially between 30 and 150 phr, the optimum being, as is known, different depending on the specific applications targeted: the level of reinforcement expected for a bicycle tyre, for example, is of course less than that required for a tyre capable of running at high speed in a sustained manner, for example a motorcycle tyre, a tyre for a passenger vehicle or a tyre for a utility vehicle, such as a heavy-duty vehicle.

According to a preferential embodiment of the invention, use is made of a reinforcing filler including between 30 and 150 phr, more preferentially between 50 and 120 phr, of organic filler, particularly of carbon black, and optionally silica; the silica, when it is present, is preferably used at a content of less than 20 phr, more preferentially of less than 10 phr (for example between 0.1 and 10 phr). This preferential embodiment is particularly preferred when the predominant elastomer of the composition is an epoxidized isoprene rubber, more particularly epoxidized natural rubber.

Alternatively, according to another preferential embodiment of the invention, use is made of a reinforcing filler including between 30 and 150 phr, more preferentially between 50 and 120 phr, of inorganic filler, particularly of silica, and optionally carbon black; the carbon black, when it is present, is preferably used at a content of less than 20 phr, more preferentially of less than 10 phr (for example between 0.1 and 10 phr). This preferential embodiment is also particularly preferred when the predominant elastomer of the composition is an epoxidized isoprene rubber, more particularly epoxidized natural rubber.

In order to couple the reinforcing inorganic filler to the elastomer, use may optionally be made, in a known manner, of an at least difunctional coupling agent (or bonding agent) intended to provide a satisfactory connection, of chemical and/or physical nature, between the inorganic filler (surface of its particles) and the elastomer, in particular difunctional organosilanes or polyorganosiloxanes.

Use may notably be made of silane polysulfides, referred to as "symmetrical" or "asymmetrical" depending on their particular structure, as described, for example, in patent applications WO 03/002648 (or US 2005/016651) and WO 03/002649 (or US 2005/016650).

As examples of silane polysulfides, mention will be made more particularly of bis(($C_1$-$C_4$)alkoxyl($C_1$-$C_4$)alkylsilyl ($C_1$-$C_4$)alkyl) polysulfides (notably disulfides, trisulfides or tetrasulfides), for instance bis(3-trimethoxysilylpropyl) or bis(3-triethoxysilylpropyl) polysulfides. Among these compounds, use is made in particular of bis(3-triethoxysilylpropyl) tetrasulfide, abbreviated to TESPT, of formula $[(C_2H_5O)_3Si(CH_2)_3S_2]_2$, or bis(triethoxysilylpropyl) disulfide, abbreviated to TESPD, of formula $[(C_2H_5O)_3Si(CH_2)_3S]_2$. As preferential examples, mention will also be made of bis(mono($C_1$-$C_4$)alkoxyldi($C_1$-$C_4$)alkylsilylpropyl) polysulfides (notably disulfides, trisulfides or tetrasulfides), more particularly bis(monoethoxydimethylsilylpropyl) tetrasulfide, as described in patent application US 2004/132880.

As coupling agent other than alkoxysilane polysulfide, mention will be made notably of difunctional POSs (polyorganosiloxanes) or else of hydroxysilane polysulfides, as described in patent applications WO 02/30939 and WO 02/31041, or else of silanes or POSs bearing azodicarbonyl functional groups, as described, for example, in patent applications WO 2006/125532, WO 2006/125533 and WO 2006/125534.

In the rubber compositions in accordance with the invention, the content of coupling agent is preferentially between 4 and 12 phr, more preferentially between 4 and 8 phr. In another arrangement, the rubber compositions in accordance with the invention do not comprise any coupling agent.

A person skilled in the art will understand that use might be made, as filler equivalent to the reinforcing inorganic filler described in the present section, of a reinforcing filler of another nature, notably organic nature, provided that this reinforcing filler is covered with an inorganic layer, such as silica, or else includes, on its surface, functional sites, notably hydroxyl sites, making it possible to establish the bonding between the filler and the elastomer in the presence or absence of a covering or coupling agent.

Crosslinking System

A crosslinking system that is capable of crosslinking or curing the rubber composition according to the invention is combined with the epoxidized elastomer and the reinforcing filler described previously. This crosslinking system comprises a polycarboxylic acid of general formula (I) and an imidazole of general formula (II).

In a manner known to those skilled in the art, an epoxidized elastomer, irrespective of the nature of the elastomer, in particular a diene, non-diene or olefinic elastomer, may be crosslinked with a crosslinking system comprising a polycarboxylic acid and an imidazole, the polyacid forming bridges via the epoxide functions, these bridges comprising ester functions.

Polyacid

The polyacid that is useful for the purposes of the invention is a polycarboxylic acid of general formula (I)

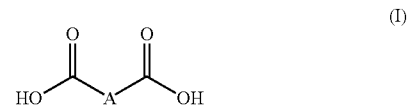

in which A represents a covalent bond or a hydrocarbon-based group which includes at least 1 carbon atom, which is optionally substituted and which is optionally interrupted with one or more heteroatoms.

Preferably, in the polyacid of general formula (I), A represents a covalent bond or a divalent hydrocarbon-based group including from 1 to 1800 carbon atoms, preferentially from 2 to 300 carbon atoms, more preferentially from 2 to 100 carbon atoms and very preferentially from 2 to 50 carbon atoms. Above 1800 carbon atoms, the polyacid is a less effective crosslinking agent. Thus, A preferably represents a divalent hydrocarbon-based group including from 3 to 50 carbon atoms, preferentially from 5 to 50 carbon atoms, more preferentially from 8 to 50 carbon atoms and even more preferentially from 10 to 40 carbon atoms. In one particular arrangement, the rubber composition according to the invention comprises between 0.9 and 30 phr of at least one polyacid, the group A of which includes between 10 and 40 carbon atoms and between 5 and 30 phr of at least one polyacid, the group A of which includes between 100 and 300 carbon atoms.

Preferentially, in the polyacid of general formula (I), A may be a divalent group of aliphatic or aromatic type or a group including at least an aliphatic portion and an aromatic portion. Preferably, A may be a divalent group of aliphatic type or a group including at least an aliphatic portion and an aromatic portion. Alternatively and preferably again, A may be a divalent group of saturated or unsaturated aliphatic type, for example an alkylene group.

The A group of the polyacid of general formula (I) may be interrupted with at least one heteroatom chosen from oxygen, nitrogen and sulfur, preferably oxygen.

Also, the A group of the polyacid of general formula (I) may be substituted with at least one radical chosen from alkyl, cycloalkylalkyl, aryl, aralkyl, hydroxyl, alkoxy, amino and carbonyl radicals.

The polyacid of general formula (I) may include more than two carboxylic acid functions; in this case, the A group is substituted with one or more carboxylic acid functions and/or with one or more hydrocarbon-based radicals chosen from alkyl, cycloalkyl, cycloalkylalkyl, aryl or aralkyl radicals, which are themselves substituted with one or more carboxylic acid functions.

According to a preferential form, the A radical does not include any other carboxylic acid functions; the polyacid is thus a diacid.

The content of polyacid is preferentially within a range extending from 0.2 to 100 phr, preferably from 0.2 to 50 phr, more preferentially from 0.4 to 30 phr and even more preferentially from 0.9 to 25 phr. Below 0.2 phr of polyacid, the effect of the crosslinking is not substantial, whereas, above 100 phr of polyacid, the polyacid, the crosslinking agent, becomes predominant by weight relative to the elastomeric matrix.

The polyacids that are useful for the purposes of the invention are either commercially available or are readily prepared by a person skilled in the art according to well-known techniques, such as the chemical routes described, for example, in U.S. Pat. No. 7,534,917 and also in the references cited therein, or biological routes, such as the fermentation described in U.S. Pat. No. 3,843,466.

For example, as polyacids that are commercially available and that are useful for the purposes of the invention, mention may be made of: oxalic acid, succinic acid, adipic acid, sebacic acid, dodecanedioic acid, terephthalic acid or else polyacids, such as trimesic acid or 3,4-bis(carboxymethyl)cyclopentanecarboxylic acid.

Imidazole

The imidazole that is useful for the crosslinking system according to the invention is an imidazole of general formula (II)

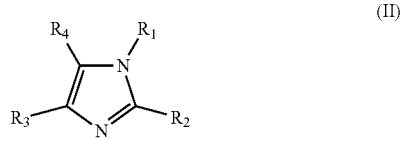

in which:
R$_1$ represents a hydrocarbon-based group or a hydrogen atom,
R$_2$ represents a hydrocarbon-based group,
R$_3$ and R$_4$ represent, independently of each other, a hydrogen atom or a hydrocarbon-based group,
or else R$_3$ and R$_4$ form, together with the carbon atoms of the imidazole ring to which they are attached, a ring.

Preferably, the imidazole of general formula (II) contains groups such that:
R$_1$ represents a hydrogen atom or an alkyl group containing from 1 to 20 carbon atoms, a cycloalkyl group containing from 5 to 24 carbon atoms, an aryl group containing from 6 to 30 carbon atoms or an aralkyl group containing from 7 to 25 carbon atoms; which group may optionally be interrupted with one or more heteroatoms and/or substituted,
R$_2$ represents an alkyl group containing from 1 to 20 carbon atoms, a cycloalkyl group containing from 5 to 24 carbon atoms, an aryl group containing from 6 to 30 carbon atoms or an aralkyl group containing from 7 to 25 carbon atoms; which group may optionally be interrupted with one or more heteroatoms and/or substituted,
R$_3$ and R$_4$ independently represent identical or different groups chosen from hydrogen or alkyl groups containing from 1 to 20 carbon atoms, cycloalkyl groups containing from 5 to 24 carbon atoms, aryl groups containing from 6 to 30 carbon atoms or aralkyl groups containing from 7 to 25 carbon atoms; which groups may optionally be interrupted with heteroatoms and/or substituted, or else R$_3$ and R$_4$ form, together with the carbon atoms of the imidazole ring to which they are attached, a ring chosen from aromatic, heteroaromatic or aliphatic rings comprising from 5 to 12 carbon atoms, preferably 5 or 6 carbon atoms.

Preferentially, R$_1$ represents a group chosen from alkyl groups containing from 2 to 12 carbon atoms or aralkyl groups containing from 7 to 13 carbon atoms; which groups may optionally be substituted. More preferentially, R$_1$ represents an optionally substituted aralkyl group containing from 7 to 13 carbon atoms and R$_2$ represents an alkyl group containing from 1 to 12 carbon atoms. Even more preferentially, R$_1$ represents an optionally substituted aralkyl group containing from 7 to 9 carbon atoms and R$_2$ represents an alkyl group containing from 1 to 4 carbon atoms.

Preferably, R$_3$ and R$_4$ independently represent identical or different groups chosen from hydrogen or alkyl groups containing from 1 to 12 carbon atoms, cycloalkyl groups containing from 5 to 8 carbon atoms, aryl groups containing from 6 to 24 carbon atoms or aralkyl groups containing from 7 to 13 carbon atoms; which groups may optionally be substituted. Alternatively and preferentially also, R$_3$ and R$_4$ form, with the carbon atoms of the imidazole ring to which they are attached, a phenyl, cyclohexene or cyclopentene ring.

For satisfactory operation of the invention, the imidazole content is preferentially within a range extending from 0.01 to 4 molar equivalents and preferably from 0.01 to 3 molar equivalents, relative to the carboxylic acid functions present on the polycarboxylic acid of general formula (I). Below 0.01 molar equivalent, no effect of the imidazole coagent is observed in comparison with the situation where the polyacid is used alone, whereas, above a value of 4 molar equivalents, no additional benefit is observed in comparison with lower contents. Thus, the imidazole content is more preferentially within a range extending from 0.01 to 2.5 molar equivalents, preferably from 0.01 to 2 molar equivalents, even more preferentially from 0.01 to 1.5 molar equivalents and preferably from 0.5 to 1.5 molar equivalents, relative to the carboxylic acid functions present on the polycarboxylic acid of general formula (I).

The imidazoles that are useful for the purposes of the invention are either commercially available or are readily prepared by a person skilled in the art according to well-known techniques, as described, for example, in JP2012211122 and JP2007269658 or in *Science of Synthesis*, 2002, 12, 325-528.

For example, as imidazoles that are commercially available and that are useful for the purposes of the invention, mention may be made of 1,2-dimethylimidazole, 1-decyl-2-methylimidazole or 1-benzyl-2-methylimidazole.

Obviously, and in accordance with the definition of the expression "based on" for the present invention, a composition based on the polyacid of general formula (I) and on the imidazole of general formula (II) which are presented above might be a composition in which said polyacid and said imidazole have reacted together beforehand to form a salt between one or more acid functions of the polyacid and, respectively, one or more imidazole nuclei.

Phenolic Compound

The composition according to the invention comprises at least one phenolic compound, this compound being an aromatic compound of general formula (III)

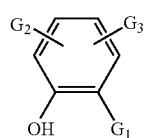

(III)

in which:
G$_1$ represents a hydroxyl, carboxyl, hydrogenocarbonyl or amino group or an aminoalkyl radical;
G$_2$ and G$_3$ represent, independently of each other, a hydrogen atom or a group chosen from carboxyl, hydrogenocarbonyl and hydroxyl groups, or a radical chosen from alkyl, cycloalkylalkyl, aryl, aralkyl, aryloxy, alkoxy, carboxylalkyl, carbonylalkyl, alkylcarbonyl, arylcarbonyl and aminoalkyl radicals;
the aromatic nucleus of said phenolic compound of general formula (III) being substituted with at least a carboxyl group, a hydrogenocarbonyl group, an amino group or an aminoalkyl radical, advantageously with at least a carboxyl group, a hydrogenocarbonyl group or an aminoalkyl radical, very advantageously with a carboxyl group or a hydrogenocarbonyl group.

In the present description, the term "phenolic compound" denotes the aromatic compound of general formula (III).

The expression "aromatic nucleus of said phenolic compound of general formula (III) being substituted with at least a carboxyl group, a hydrogenocarbonyl group or an aminoalkyl radical" means that said substituent is directly attached to one of the carbon atoms of the aromatic nucleus represented in the general formula (III).

The term "carboxyl group" or "carboxylic acid function" means a group of formula —COOH in which the carbon atom is linked via a double bond to an oxygen atom and via a single bond to a hydroxyl group —OH.

The term "hydrogenocarbonyl group" means a group of formula —CHO in which the carbon atom is linked via a double bond to an oxygen atom and via a single bond to a hydrogen atom.

The term "amino group" means a group of formula —NH$_2$.

The term "aminoalkyl radical" means a radical of formula —C$_n$H$_{2n}$—NH$_2$, in which n is an integer advantageously between 1 and 15, preferentially between 1 and 10, very preferentially between 1 and 5 and preferably between 1 and 3.

Advantageously, G$_2$ and G$_3$ represent, independently of each other, a hydrogen atom or a group chosen from carboxyl, hydrogenocarbonyl and hydroxyl groups, or an alkyl radical.

Preferentially, G$_2$ and G$_3$, independently of each other, are a hydrogen atom, or comprise from 1 to 10 carbon atoms, preferentially from 1 to 6 carbon atoms, advantageously from 1 to 5 carbon atoms and preferably from 1 to 3 carbon atoms.

In a preferred arrangement, G$_1$ is a hydroxyl group and G$_2$ is a hydroxyl group or a hydrogen atom.

In another preferred arrangement, G$_1$ is a carboxyl group and G$_2$ is a hydrogen atom. In one variant of this arrangement, G$_3$ is a hydrogen atom. In another variant of this arrangement, G$_3$ is a hydroxyl group.

Irrespective of the preferred embodiment, the molar mass of the aromatic compound of general formula (III) is advantageously less than 1000 g/mol, preferably less than 800 g/mol, preferentially less than 600 g/mol, very preferably less than 400 g/mol, very preferentially less than 220 g/mol, very preferentially less than 200 g/mol, or even 180 g/mol.

Very preferably, the phenolic compound of general formula (III) is chosen from the group consisting of gallic acid, protocatechuic acid, salicylic acid, protocatechuic aldehyde and para-hydroxybenzoic acid.

The rubber composition according to the invention has particularly advantageous characteristics in terms of adhesion to a metallic component, notably by virtue of the presence of the phenolic compound of general formula (III), in particular for making composites, and most particularly composites intended for tyres.

The rubber composition according to the invention advantageously comprises from 0.1 to 25 phr of phenolic compound, preferentially from 2 to 15 phr. Below 0.1 phr, the phenolic compound has no notable effect on the adhesion properties of the rubber composition according to the invention. Above 25 phr, no further significant gain is observed.

Various Additives

The rubber compositions in accordance with the invention may also include all or some of the usual additives known to a person skilled in the art and usually used in rubber compositions for tyres, in particular internal layers as defined hereinafter in the present patent application, for instance plasticizers (plasticizing oils and/or plasticizing resins), reinforcing fillers or non-reinforcing fillers other than those mentioned above, pigments, protective agents such as antiozone waxes, chemical antiozonants, antioxidants, antifatigue agents or reinforcing resins (as described, for example, in patent application WO 02/10269).

These compositions may also contain, in addition to the coupling agents, coupling activators, agents for covering the inorganic fillers or more generally processing aids capable, in a known manner, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes (for example octyltriethoxysilane or octeo silane), polyols, polyethers, primary, secondary or tertiary amines, or hydroxylated or hydrolysable polyorganosiloxanes.

Preferentially, the rubber compositions of the invention are free of a crosslinking system other than the one described previously, and which includes at least one polyacid and at least one imidazole. In other words, the crosslinking system based on at least one polyacid and at least one imidazole is preferentially the only crosslinking system in the rubber composition of the invention. Preferably, the rubber compositions of the invention are free of a vulcanization system or contain less than 1 phr, preferably less than 0.5 phr and more preferentially less than 0.2 phr thereof. Thus, the rubber composition according to the invention is preferentially free of molecular sulfur or contains less than 1 phr, preferably less than 0.5 phr and more preferentially less than 0.2 phr thereof. Similarly, the composition is preferentially free of any vulcanization accelerator or activator as known to those skilled in the art or contains less than 1 phr, preferably less than 0.5 phr and more preferentially less than 0.2 phr thereof.

Similarly, the composition is preferentially free of cobalt salts as known to those skilled in the art, and of which the effect known to those skilled in the art is improved adhesion, or contains less than 1 phr, preferably less than 0.5 phr, more preferentially less than 0.2 phr and very preferentially less than 0.1 phr thereof.

Thus, surprisingly, very good adhesion of the composition according to the invention to reinforcing cables is obtained without it being necessary to use cobalt salts.

Preparation of the Rubber Compositions

The rubber composition in accordance with the invention is manufactured in suitable mixers using preparation phases that are well known to those skilled in the art:

a thermomechanical working or kneading phase, which may be performed in a single thermomechanical step during which all the necessary constituents, notably the elastomeric matrix, the crosslinking system comprising the polycarboxylic acid and the imidazole, the phenolic compound, the fillers and the optional various other additives are introduced into an appropriate mixer, such as a standard internal mixer (for example of 'Banbury' type). The incorporation of the filler into the elastomer may be performed in one or more portions while thermomechanically kneading. In the case where the filler, in particular the carbon black, is already incorporated, completely or partly, into the elastomer in the form of a masterbatch, as is described, for example, in patent application WO 97/36724 or WO 99/16600, it is the masterbatch which is directly kneaded and, where appropriate, the other elastomers or fillers present in the composition which are not in the masterbatch form, and also the optional various other additives, are incorporated.

The thermomechanical kneading is performed at high temperature, up to a maximum temperature of between 110° C. and 200° C., preferably between 130° C. and 185° C., for a period of time generally between 2 and 10 minutes.

a second phase of mechanical working may then be performed in an external mixer, such as an open mill, after cooling the mixture obtained during the first phase to a lower temperature, typically below 120° C., for example between 40° C. and 100° C.

The final composition thus obtained is subsequently calendered, for example in the form of a sheet or of a plaque, notably for laboratory characterization, or else extruded in the form of a rubber semi-finished article (or profiled element).

The composition may be either in the raw state (before crosslinking or vulcanization) or in the cured state (after crosslinking or vulcanization), may be a semi-finished product which can be used in a tyre.

The curing may be performed, in a manner known to those skilled in the art, at a temperature generally between 130° C. and 200° C., under pressure, for a sufficient time which may vary, for example, between 5 and 90 minutes as a function notably of the curing temperature, of the crosslinking system adopted, of the kinetics of crosslinking of the composition under consideration or of the size of the tyre.

Composite

The invention also relates to a composite based at least on a component and on a rubber composition according to the invention.

The expression composite "based at least on a component and on a composition according to the invention" should be understood as meaning a composite comprising the component and said composition, the composition having been able to react with the component during the various phases of manufacture of the composite, in particular during the crosslinking of the composition or during the manufacture of the composite before crosslinking of the composition.

Said component may be totally or partly metallic or textile-based. In particular, said component may be of textile nature, i.e. made of an organic material, notably a polymeric material, or an inorganic material, for instance glass, quartz, basalt or carbon. The polymeric materials may be of the thermoplastic type, for instance aliphatic polyamides, notably polyamides 6-6, and polyesters, notably polyethylene terephthalate. The polymeric materials may be of the non-thermoplastic type, for instance aromatic polyamides, notably aramid, and cellulose, either natural or artificial, notably rayon.

In one particular arrangement, said component comprises a metal surface.

The metal surface of the component constitutes at least part and advantageously all of the surface of said component and is intended to come into contact with the composition according to the invention.

The composition according to the invention covers at least part of the component, advantageously all of said component.

The component is advantageously partly or entirely metallic, the metal part comprising at least the metal surface. Preferably, the component is entirely made of metal.

According to a first variant of the invention, the metal surface of the component is made of a material which is different from the rest of the component. In other words, the component is made of a material which is at least partly, advantageously totally, covered with a metal layer which forms the metal surface. The material at least partly, advantageously totally, covered with the metal surface is metallic or non-metallic, preferably metallic, in nature.

According to a second variant of the invention, the component is made of the same material, in which case the component is made of a metal which is identical to the metal of the metal surface.

According to one embodiment of the invention, the metal surface comprises a metal chosen from the group consisting of iron, copper, zinc, tin, aluminium, cobalt, nickel and alloys including at least one of these metals. The alloys may be, for example, binary or ternary alloys, such as steel, bronze and brass. Preferably, the metal of the metal surface is iron, copper, tin, zinc or an alloy including at least one of these metals. More preferentially, the metal of the metal surface is steel, brass (Cu—Zn alloy), zinc or bronze (Cu—Sn alloy), even more preferably brass or zinc and very preferably brass.

In the present patent application, the expression "the metal of the metal surface is the metal denoted hereinafter" amounts to saying that the metal surface is made of metal denoted hereinafter. For example, the expression "the metal of the metal surface is brass" written above means that the metal surface is made of brass. Since certain metals are subject to oxidation on contact with ambient air, the metal may be partially oxidized, with the exception of stainless steel.

When the metal surface is made of steel, the steel is preferably a carbon steel or a stainless steel. When the steel is a carbon steel, its carbon content is preferably between 0.01% and 1.2% or between 0.05% and 1.2%, or else between 0.2% and 1.2%, notably between 0.4% and 1.1%. When the steel is stainless, it preferably includes at least 11% of chromium and at least 50% of iron.

The component may be in any form. Preferably, the component is provided in the form of a thread or of a cable.

According to a particular embodiment of the invention, the component has a length which is at least equal to a millimetre. The length means the longest dimension of the component. As components having a length which is at least equal to a millimetre, mention may be made of the reinforcing elements used, for example, in vehicle tyres, such as threadlike elements (monofilament or cable) and non-threadlike elements.

According to a particularly preferential embodiment of the invention, the composite is a reinforced structure in which the component constitutes a reinforcing element and in which the composition according to the invention coats the reinforcing element.

According to a particularly preferential embodiment, the composite is a reinforced product which comprises reinforcing elements and a calendering rubber in which the reinforcing elements are embedded, each reinforcing element consisting of a component previously defined according to any one of the embodiments of the invention and the calendering rubber comprising the rubber composition according to the invention. According to this embodiment, the reinforcing elements are generally arranged side by side in a main direction. For an application envisaged in the tyre, the composite may thus constitute a tyre reinforcement.

The composite in accordance with the invention may be in the raw state (before crosslinking of the rubber composition) or in the cured state (after crosslinking of the rubber composition). The composite is cured after placing the component in contact with the rubber composition according to the invention.

The composite may be manufactured by a process that comprises the following steps:
making two layers of the composition according to the invention,
sandwiching the component between the two layers by depositing it between the two layers,
where appropriate, curing the composite.

Alternatively, the composite may be manufactured by depositing the component on a portion of a layer, the layer is then folded over on itself to cover the component which is thus sandwiched over its entire length or a part of its length.

The layers may be produced by calendering. During the curing of the composite, the rubber composition is crosslinked.

When the composite is intended to be used as a reinforcement in a tyre, the curing of the composite generally takes place during the curing of the tyre casing.

Tyre

The tyre, which is another subject of the invention, has the essential feature of comprising the composition or the composite in accordance with the invention. The tyre may be in the raw state (before crosslinking of the rubber composition) or in the cured state (after crosslinking of the rubber composition). Generally, during the manufacture of the tyre, the composition or the composite is deposited in the raw state (i.e. before crosslinking of the rubber composition) in the structure of the tyre before the step of curing the tyre.

The invention relates in particular to tyres intended to equip motor vehicles of passenger vehicle type, SUVs ("Sport Utility Vehicles"), or two-wheel vehicles (notably motorcycles), or aircraft, or else industrial vehicles chosen from vans, heavy-duty vehicles, i.e. underground trains, buses, road transport vehicles (lorries, tractors, trailers) or off-road vehicles, such as agricultural vehicles or construction vehicles, and the like.

It is possible to define, within the tyre, three types of regions:
The radially exterior region in contact with the ambient air, this region essentially consisting of the tread and of the outer sidewall of the tyre. An outer sidewall is an elastomeric layer positioned outside the carcass reinforcement relative to the inner cavity of the tyre, between the crown and the bead, so as to completely or partially cover the region of the carcass reinforcement extending from the crown to the bead.

The radially interior region in contact with the inflation gas, this region generally consisting of the layer airtight to the inflation gases, sometimes known as the interior airtight layer or inner liner.

The internal region of the tyre, i.e. the region between the exterior and interior regions. This region includes layers or plies which are referred to here as internal layers of the tyre. These are, for example, carcass plies, tread sublayers, tyre belt plies or any other layer which is not in contact with the ambient air or the inflation gas of the tyre.

The composition defined in the present description is particularly well suited to the internal layers of tyres.

Thus, the invention also relates to a tyre comprising an internal layer including a composition or a composite according to the present invention. According to the invention, the internal layer may be chosen from the group consisting of carcass plies, crown plies, bead-wire fillings, crown feet, decoupling layers, the tread underlayer and combinations of these internal layers. Preferably, the internal layer is chosen from the group consisting of carcass plies, crown plies, bead-wire fillings, crown feet, decoupling layers and combinations of these internal layers.

Thus, without this being limiting, the subject of the invention is at least one of the following embodiments:

1. A rubber composition based on at least one elastomer comprising epoxide functions, at least one reinforcing filler, a crosslinking system comprising a polycarboxylic acid of general formula (I)

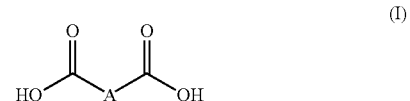

(I)

in which A represents a covalent bond or a hydrocarbon-based group including at least 1 carbon atom, which is optionally substituted and which is optionally interrupted with one or more heteroatoms, an imidazole of general formula (II)

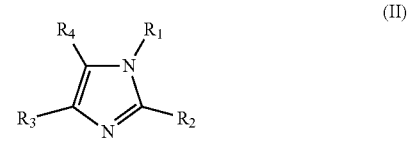

(II)

in which:
$R_1$ represents a hydrocarbon-based group or a hydrogen atom,
$R_2$ represents a hydrocarbon-based group,
$R_3$ and $R_4$ represent, independently of each other, a hydrogen atom or a hydrocarbon-based group, or alternatively $R_3$ and $R_4$ form, together with the carbon atoms of the imidazole ring to which they are attached, a ring, and at least one phenolic compound of general formula (III)

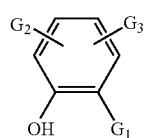

in which:
- G₁ represents a hydroxyl, carboxyl, hydrogenocarbonyl or amino group or an aminoalkyl radical;
- G₂ and G₃ represent, independently of each other, a hydrogen atom or a group chosen from carboxyl, hydrogenocarbonyl and hydroxyl groups, or a radical chosen from alkyl, cycloalkylalkyl, aryl, aralkyl, aryloxy, alkoxy, carboxylalkyl, carbonylalkyl, alkylcarbonyl, arylcarbonyl and aminoalkyl radicals;

the aromatic nucleus of said phenolic compound of general formula (III) being substituted with at least a carboxyl group, a hydrogenocarbonyl group, an amino group or an aminoalkyl radical.

2. A composition according to the preceding embodiment, in which G₂ and G₃ represent, independently of each other, a hydrogen atom or a group chosen from carboxyl, hydrogenocarbonyl and hydroxyl groups, or an alkoxy radical.

3. A composition according to one of the preceding embodiments, in which G₂ and G₃, independently of each other, are either a hydrogen atom, or comprise from 1 to 10 carbon atoms.

4. A composition according to one of the preceding embodiments, in which G₁ is a hydroxyl group and G₂ is a hydroxyl group or a hydrogen atom.

5. A composition according to embodiment 1, in which G₁ is a carboxyl group and G₂ is a hydrogen atom.

6. A composition according to embodiment 5, in which G₃ is a hydrogen atom.

7. A composition according to embodiment 5, in which G₃ is a hydroxyl group.

8. A composition according to one of embodiments 1 to 5, in which said aminoalkyl radical comprises from 1 to 15 carbon atoms.

9. A composition according to one of the preceding embodiments, in which the molar mass of said phenolic compound is less than 1000 g/mol.

10. A composition according to one of the preceding embodiments, in which the content of phenolic compound is between 0.1 and 25 phr.

11. A composition according to one of the preceding embodiments, in which said composition is free of molecular sulfur or contains less than 1 phr thereof.

12. A composition according to one of the preceding embodiments, in which said composition is free of cobalt salts or contains less than 1 phr thereof.

13. A rubber composition according to any one of embodiments 1 to 12, in which A represents a covalent bond or a divalent hydrocarbon-based group including from 1 to 1800 carbon atoms and preferably from 2 to 300 carbon atoms.

14. A rubber composition according to any one of embodiments 1 to 13, in which A is a divalent group of aliphatic or aromatic type or a group including at least an aliphatic portion and an aromatic portion.

15. A rubber composition according to any one of embodiments 1 to 14, in which A is a divalent group of saturated or unsaturated aliphatic type.

16. A rubber composition according to any one of embodiments 1 to 15, in which A is an alkylene group.

17. A rubber composition according to any one of embodiments 1 to 16, in which A is interrupted with at least one heteroatom chosen from oxygen, nitrogen and sulfur, preferably oxygen.

18. A rubber composition according to any one of embodiments 1 to 17, in which A is substituted with at least one radical chosen from alkyl, cycloalkylalkyl, aryl, aralkyl, hydroxyl, alkoxy, amino and carbonyl radicals.

19. A composition according to any one of embodiments 1 to 18, in which A is substituted with one or more carboxylic acid functions and/or with one or more hydrocarbon-based radicals chosen from alkyl, cycloalkyl, cycloalkylalkyl, aryl or aralkyl radicals, which are themselves substituted with one or more carboxylic acid functions.

20. A composition according to any one of embodiments 1 to 19, in which the A radical does not include any other carboxylic acid functions.

21. A rubber composition according to any one of the preceding embodiments, in which the content of polyacid is within a range extending from 0.2 to 100 phr and preferably from 0.2 to 50 phr.

22. A rubber composition according to any one of the preceding embodiments, in which:
- R₁ represents a hydrogen atom or an alkyl group containing from 1 to 20 carbon atoms, a cycloalkyl group containing from 5 to 24 carbon atoms, an aryl group containing from 6 to 30 carbon atoms or an aralkyl group containing from 7 to 25 carbon atoms; which group may optionally be interrupted with one or more heteroatoms and/or substituted,
- R₂ represents an alkyl group containing from 1 to 20 carbon atoms, a cycloalkyl group containing from 5 to 24 carbon atoms, an aryl group containing from 6 to 30 carbon atoms or an aralkyl group containing from 7 to 25 carbon atoms; which group may optionally be interrupted with one or more heteroatoms and/or substituted,
- R₃ and R₄ independently represent identical or different groups chosen from hydrogen or alkyl groups containing from 1 to 20 carbon atoms, cycloalkyl groups containing from 5 to 24 carbon atoms, aryl groups containing from 6 to 30 carbon atoms or aralkyl groups containing from 7 to 25 carbon atoms; which groups may optionally be interrupted with heteroatoms and/or substituted, or else R₃ and R₄ form, together with the carbon atoms of the imidazole ring to which they are attached, a ring chosen from aromatic, heteroaromatic or aliphatic rings comprising from 5 to 12 carbon atoms, preferably 5 or 6 carbon atoms.

23. A rubber composition according to any one of the preceding embodiments, in which R₁ represents a group chosen from alkyl groups containing from 2 to 12 carbon atoms or aralkyl groups containing from 7 to 13 carbon atoms; which groups may optionally be substituted.

24. A rubber composition according to any one of the preceding embodiments, in which R₁ represents an optionally substituted aralkyl group containing from 7 to 13 carbon atoms and R₂ represents an alkyl group containing from 1 to 12 carbon atoms.

25. A rubber composition according to any one of the preceding embodiments, in which R₃ and R₄ independently represent identical or different groups chosen from hydrogen or alkyl groups containing from 1 to 12 carbon atoms, cycloalkyl groups containing from 5 to 8 carbon atoms, aryl groups containing from 6 to 24 carbon atoms or aralkyl groups containing from 7 to 13 carbon atoms; which groups may optionally be substituted.

26. A rubber composition according to any one of the preceding embodiments, in which the reinforcing filler includes carbon black, silica or a mixture of carbon black and silica.

27. A rubber composition according to any one of the preceding embodiments, in which the content of reinforcing filler is between 20 and 200 phr.

28. A composite based at least on a component and on a composition according to one of embodiments 1 to 27.

29. A composite according to embodiment 28, having a metal surface.

30. A composite according to embodiment 29, in which the metal surface of the component is made of a material which is different from the rest of the component.

31. A composite according to either of embodiments 29 and 30, in which the metal surface of said component comprises a metal chosen from the group consisting of iron, copper, zinc, tin, aluminium, cobalt, nickel and alloys including at least one of these metals.

32. A composite according to any one of embodiments 29 to 31, in which the metal of the metal surface is iron, copper, tin, zinc or an alloy including at least one of these metals.

33. A composite according to any one of embodiments 29 to 32, in which the metal of the metal surface is brass or zinc.

34. A composite according to any one of embodiments 28 to 33, in which the component has a length at least equal to a millimetre.

35. A composite according to any one of embodiments 28 to 34, in which the component is a thread or a cable.

36. A tyre comprising a composition according to one of embodiments 1 to 27 or a composite according to one of embodiments 28 to 35.

37. A tyre comprising an internal layer including a composition according to one of embodiments 1 to 27 or a composite according to one of embodiments 28 to 35.

Examples

The quality of the bonding between the rubber composition and the component is determined by a test in which the force required to extract sections of individual threads having a metal surface from the crosslinked rubber composition is measured. For this purpose, composites are prepared in the form of test specimens containing, on the one hand, individual metallic threads as component having a metal surface and, on the other hand, an elastomeric mixture comprising the crosslinked rubber composition.

Preparation of the Rubber Compositions

The preparation of the various rubber compositions is performed in the following manner: the polymer comprising epoxide functions and then all the other constituents of the mixture are successively introduced into an internal mixer (final degree of filling: approximately 70% by volume), the initial vessel temperature of which is approximately 60° C. Thermomechanical working is then performed in one step until a maximum "dropping" temperature of 150° C. is reached. The mixture thus obtained is recovered and cooled on an external mixer (homofinisher) at 30° C., everything being mixed.

TABLE 1

|  | C1 | C2 | I1 | I2 | I3 | I4 | C3 |
|---|---|---|---|---|---|---|---|
| eNR25 (1) | 100 | 100 | 100 | 100 | 100 | 100 | 100 |
| Silica 160 MP (2) | 60 | 60 | 60 | 60 | 60 | 60 | 60 |
| Silane Octeo (3) | 4.8 | 4.8 | 4.8 | 4.8 | 4.8 | 4.8 | 4.8 |
| 6PPD (4) | 1.5 | 1.5 | 1.5 | 1.5 | 1.5 | 1.5 | 1.5 |
| Diacid PBACN (5) | 24.8 | 24.8 | 24.8 | 24.8 | 24.8 | 24.8 | 24.8 |
| Imidazole BMI (6) | 2.2 | 2.2 | 2.2 | 2.2 | 2.2 | 2.2 | 2.2 |
| 3,4-Dihydroxy-hydrocinnamic acid (7) | 0 | 5.4 | 0 | 0 | 0 | 0 | 0 |
| Gallic acid (7) | 0 | 0 | 5 | 0 | 0 | 0 | 0 |
| Protocatechuic acid (7) | 0 | 0 | 0 | 4.5 | 0 | 0 | 0 |
| Salicylic acid (7) | 0 | 0 | 0 | 0 | 4 | 0 | 0 |
| Protocatechuic aldehyde (7) | 0 | 0 | 0 | 0 | 0 | 4 | 0 |
| para-Hydroxybenzoic acid (7) | 0 | 0 | 0 | 0 | 0 | 0 | 4 |

All the compositions are given in phr
(1) Epoxidized Natural Rubber, "ENR-25", from the company Guthrie Polymer;
(2) Silica 160 MP, Zeosil 1165MP from the company Rhodia;
(3) Dynasylan Octeo from the company Degussa;
(4) N-(1,3-dimethylbutyl)-N-phenyl-para-phenylenediamine (Santoflex 6-PPD from the company Flexsys);
(5) Poly(acrylonitrile-co-butadiene), dicarboxy-terminated, Sigma-Aldrich ref. 418870, Mn = 3800 g/mol;
(6) 1-Benzyl-2-methylimidazole, CAS = 13750-62-4 from the company Sigma-Aldrich;
(7) Sigma-Aldrich
It is noted that the composition "C1" does not include any specific phenolic compound.

Preparation of the Test Specimens

The rubber compositions thus prepared are used to make a composite in the form of a test specimen, according to the following protocol:

A block of rubber is prepared, consisting of two plates applied to each other before curing. The two plates of the block consist of the same rubber composition. It is during the preparation of the block that the individual threads are trapped between the two plates in the raw state, at an equal distance apart and while leaving to protrude, on either side of these plates, an individual thread end having a length sufficient for the subsequent tensile test. The block including the individual threads is then placed in a mould adapted to the targeted test conditions and left to the discretion of a person skilled in the art; by way of example, in the present case, the block is cured at 170° C. for a time varying from 25 min to 90 min according to the composition, under a pressure of 5.5 tonnes.

The individual threads are bright (i.e. non-coated) steel threads or steel threads coated with brass, zinc or bronze. Their diameter is 1.30 mm; the thickness of the brass coating is from 200 nm to 1 μm, and the thickness of the zinc or bronze coating is from 50 nm to 0.1 μm.

The test specimens thus prepared with conforming compositions correspond to composites in accordance with the invention.

Adhesion Test

On conclusion of the curing, the test specimen thus consisting of the crosslinked block and individual threads is placed between the jaws of a suitable tensile testing machine in order to make it possible to test each section individually, at a given rate and a given temperature (for example, in the present case, at 100 mm/min and ambient temperature).

The adhesion levels are characterized by measuring the "tearing-out" force for tearing the sections out of the test specimen.

The results are expressed in base 100 relative to a control test specimen which contains individual threads of identical nature to that of the test specimen tested and which contains the rubber composition "C1" presented in Table 1.

A value greater than that for the control test specimen, arbitrarily set at 100, indicates an improved result, i.e. a greater tearing-out force than that for the control test specimen, the value of which is arbitrarily set at 100.

TABLE 2

| Test specimen | C1 | C2 | I1 | I2 | I3 | I4 | C3 |
|---|---|---|---|---|---|---|---|
| Brass | 100 | 63 | 675 | 375 | 350 | 488 | 34 |
| Zinc | 100 | 84 | 832 | 447 | 263 | 274 | 63 |
| Steel | 100 | — | 302 | — | — | 169 | — |
| Bronze | 100 | — | 315 | — | — | 139 | — |

—: Not measured

Example 1

This example shows the improvement in adhesion afforded by compositions according to the invention relative to control compositions.

Table 2 shows the results of the adhesion tests performed on control test specimens and on test specimens in accordance with the invention.

Presenting values very much higher than 100 in the adhesion test, the composites according to the invention have greatly improved tearing-out resistance, not only in the case of thread elements made of brass but also of those made of zinc, steel or bronze.

The improvement in the performance of the composite is observed in the absence of any sulfurization step.

The invention claimed is:

1. A composite comprising a component and a rubber composition, where the component comprises a metal surface and where the rubber composition is based on:
    70-100 phr of at least one elastomer comprising epoxide functions;
    at least one reinforcing filler;
    a crosslinking system comprising a polycarboxylic acid of general formula (I) and an imidazole of general formula (II)

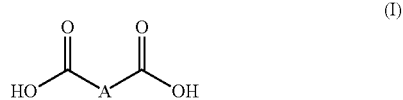

in which A represents a covalent bond or a hydrocarbon-based group including at least one carbon atom, which is optionally substituted and which is optionally interrupted with one or more heteroatoms, and

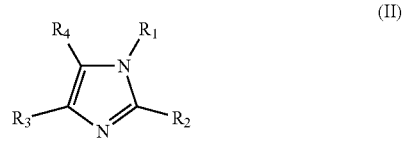

in which $R_1$ is a hydrocarbon-based group or a hydrogen atom, $R_2$ is a hydrocarbon-based group, and $R_3$ and $R_4$ are, independently of each other, a hydrogen atom or a hydrocarbon-based group, or alternatively $R_3$ and $R_4$ form, together with the carbon atoms of the imidazole ring to which they are attached, a ring; and
    and protocatechuic aldehyde,
    wherein the composite is not vulcanized.

2. The composite according to claim 1, wherein the reinforcing filler includes carbon black, silica or a mixture of carbon black and silica.

3. The composite according to claim 1, wherein, in the rubber composition, a content of reinforcing filler is between 20 and 200 phr.

4. The composite according to claim 1, wherein, in the rubber composition, a content of the polycarboxylic acid is within a range extending from 0.2 to 100 phr.

5. The composite according to claim 1, wherein a molar mass of protocatechuic aldehyde is less than 1000 g/mol.

6. The composite according to claim 1, wherein, in the rubber composition, a content of protocatechuic aldehyde is between 0.1 and 25 phr.

7. A tire comprising a composite according to claim 1.

* * * * *